(12) United States Patent
Ba-Abbad et al.

(10) Patent No.: US 8,551,343 B2
(45) Date of Patent: Oct. 8, 2013

(54) METHOD AND SYSTEM FOR UTILIZING WASTE ENERGY FROM A FLUID PURIFICATION SYSTEM

(75) Inventors: Mazen Abdullah Ba-Abbad, Riyadh (SA); Hany Abdulrahman Al-Ansary, Riyadh (SA)

(73) Assignee: King Abdulaziz City for Science and Technology (KACST), Riyadh (SA)

( * ) Notice: Subject to any disclaimer, the term of this patent is extended or adjusted under 35 U.S.C. 154(b) by 531 days.

(21) Appl. No.: 12/786,858

(22) Filed: May 25, 2010

(65) Prior Publication Data

US 2011/0290636 A1 Dec. 1, 2011

(51) Int. Cl.
*B01D 3/00* (2006.01)
*C02F 1/04* (2006.01)
*F03G 6/00* (2006.01)
*F01L 3/00* (2006.01)

(52) U.S. Cl.
USPC ........ 210/747.5; 60/641.8; 60/641.9; 60/650; 60/659; 165/10; 165/185; 202/182; 203/11; 203/21; 210/175; 210/257.1; 210/321.66; 210/774

(58) Field of Classification Search
USPC ............ 60/641.8, 641.9, 650, 659; 159/47.1, 159/47.3; 165/185, 10, 120, 132, 157; 202/82, 202/96, 152, 176, 182; 203/10, 11, 21, 22, 203/24; 210/175, 257.1, 257.2, 194, 321.66, 210/637, 650, 774, 805, 170.11, 184, 747.5; 290/43, 52, 54
See application file for complete search history.

(56) References Cited

U.S. PATENT DOCUMENTS

| | | | | |
|---|---|---|---|---|
| 4,218,290 A * | 8/1980 | Phillips et al. | | 203/11 |
| 4,308,111 A * | 12/1981 | Pampel | | 203/49 |
| 5,168,728 A * | 12/1992 | Djelouah et al. | | 62/532 |
| 5,346,592 A * | 9/1994 | Madani | | 202/176 |
| 5,925,223 A * | 7/1999 | Simpson et al. | | 203/11 |
| 6,606,860 B2 * | 8/2003 | McFarland | | 60/648 |
| 7,708,865 B2 * | 5/2010 | Holtzapple et al. | | 203/25 |
| 7,837,768 B2 * | 11/2010 | Sanderson et al. | | 95/158 |
| 8,317,982 B2 * | 11/2012 | Kumar | | 203/11 |
| 8,328,995 B2 * | 12/2012 | Eddington | | 203/10 |
| 2004/0206681 A1 * | 10/2004 | Gordon | | 210/259 |
| 2007/0295673 A1 * | 12/2007 | Enis et al. | | 210/766 |
| 2008/0149573 A1 * | 6/2008 | Fein et al. | | 210/799 |
| 2010/0192575 A1 * | 8/2010 | Al-Mayahi et al. | | 60/671 |
| 2010/0276935 A1 * | 11/2010 | Dehlsen et al. | | 290/54 |
| 2011/0147195 A1 * | 6/2011 | Shapiro et al. | | 203/10 |

* cited by examiner

*Primary Examiner* — Joseph Drodge
(74) *Attorney, Agent, or Firm* — Timberline Patent Law Group PLLC

(57) ABSTRACT

A method and system for managing heat energy in a fluid purification system is provided. Initially, air is compressed using one or more compressors to obtain a compressed hot air. Then one or more fluids are purified using the heat energy associated with the compressed hot air in one or more fluid purification units thereby releasing a compressed cooled air. One or more hot purified fluids are stored in one or more fluid storage tanks obtained in response to the purification of the one or more fluids. Thereafter, the compressed cooled air is heated using a heat energy associated with the one or more hot purified fluids to obtain a heated compressed air. Subsequently, one or more turbines are operated using heat energy associated with the heated compressed air to obtain an expanded cooled air. The expanded cooled air is utilized for cooling.

14 Claims, 4 Drawing Sheets

US 8,551,343 B2

METHOD AND SYSTEM FOR UTILIZING WASTE ENERGY FROM A FLUID PURIFICATION SYSTEM

FIELD OF THE INVENTION

The invention generally relates to a fluid purification system, and more specifically, to managing heat energy in the fluid purification system.

BACKGROUND OF THE INVENTION

Nowadays heat energy is commonly used in various processes. The heat energy is usually produced from various renewable energy sources or as a byproduct of various industries. The heat energy produced as a byproduct from the industries is usually wasted due to lack of utilization of the heat energy within the industries.

In existing technologies, the heat energy released by various industries is partially utilized in various processes. In order to utilize the heat energy, the industries reuse the released heat energy in different sub-processes inside the industry. However, reusing of the heat energy has several infrastructural constraints inside the industries.

For instance, fluid purification systems generally use heat energy to purify fluids such as, sea water and waste water. Purification of the waste water and the sea water is a huge industry considering the amount of sea water available on the earth and also the increasing need of a pure or a distilled water. The fluid purification systems consume large amount of heat energy in purifying the fluids. During the process of purification, the fluid purification systems release a large amount of heat energy. The major portion of this heat energy is wasted due to the lack of utilization of the heat energy within the fluid purification systems.

Therefore, there is a need for a method and system for efficiently managing heat energy in a fluid purification system.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the invention.

Figure 1:
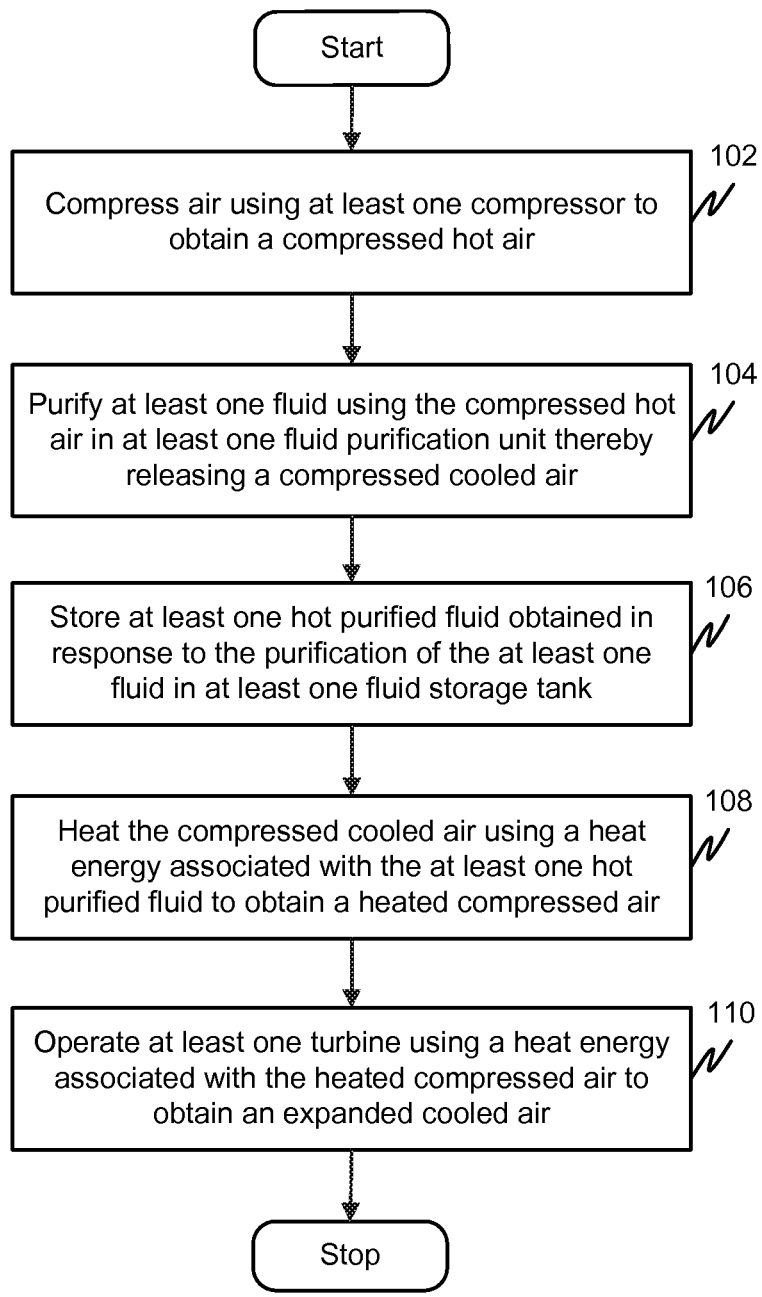
FIG. 1 is a flow chart illustrating a method of managing heat energy in a fluid purification system in accordance with an embodiment of the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION OF THE INVENTION

Before describing in detail embodiments that are in accordance with the invention, it should be observed that the embodiments reside primarily in combinations of method steps and apparatus components related to a method and system for managing heat energy in a fluid purification system. Accordingly, the apparatus components and method steps have been represented where appropriate by conventional symbols in the drawings, showing only those specific details that are pertinent to understanding the embodiments of the invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises", "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Generally speaking, pursuant to various embodiments, the invention provides a method and system for managing heat energy in a fluid purification system. The method includes compressing air using one or more compressors to obtain a compressed hot air. A heat energy associated with the compressed hot air is greater than a heat energy associated with the air. The method further includes purifying one or more fluids using the compressed hot air in one or more fluid purification units. The one or more fluids are purified using the heat energy associated with the compressed hot air. In response to purifying the one or more fluids, a compressed cooled air is released. One or more hot purified fluids are obtained in response to the purification of the one or more fluids. The one or more hot purified fluids are stored in one or more fluid storage tanks The method further includes heating the compressed cooled air using a heat energy associated with the one or more hot purified fluids to obtain a heated compressed air. Subsequently, one or more turbines are operated using heat energy associated with the heated compressed air thereby obtaining an expanded cooled air. Thereafter, the expanded cooled air is utilized for cooling.

FIG. 1 is a flow chart illustrating a method of managing heat energy in a fluid purification system, in accordance with an embodiment of the invention. The fluid purification system purifies one or more fluids. The one or more fluids may include for example, but not limited to, a waste water and a sea water. In order to purify the one or more fluids the heat energy associated with air is used. To use the heat energy associated with the air, the air is compressed using one or more compressors at step 102. In an embodiment, the air received by the one or more compressors may be an ambient air.

In another embodiment, the one or more compressors receive the air from one or more solar energy units. In order to receive the air from the one or more solar energy units, one or more suctions tubes that connect the one or more solar energy units and the one or more compressors are used. In this scenario, the heat energy associated with the air is obtained from solar energy. For example, air present in an enclosure of a solar energy unit is received by a compressor. The air obtains heat energy from solar energy. This air is sucked from the enclosure of the solar energy unit by one or more suction tubes and supplied to the compressor. Thereafter, the air is compressed using the compressor to obtain the compressed hot air. Thus, the heat energy associated with the air present in the enclosure of the one or more solar energy units is utilized. It will be apparent to a person skilled in the art that the one or more compressors may receive the air from any other sources of hot air known in the art.

Further, the one or more compressors compress the air to obtain a compressed hot air. A heat energy associated with the compressed hot air is greater than a heat energy associated with the air. Referring to the above example, a compressor of the one or more compressors compresses the air obtained from the solar energy unit. The compression of the air results in obtaining the compressed hot air with increased temperature and pressure as compared to the air obtained from the solar energy unit.

In response to obtaining the compressed hot air, the one or more fluids are purified using the compressed hot air at step 104. The one or more fluids are purified in one or more fluid purification units using the heat energy associated with the compressed hot air. Once the one or more fluids are purified, a compressed cooled air is released. For example, a fluid purification unit uses the heat energy associated with the compressed hot air to purify sea water. In this case, the heat energy obtained from the air in the enclosure of the solar energy unit is utilized for the purification of the sea water. When the sea water is purified, the compressed cooled air is released.

In an embodiment, the compressed cooled air released is stored. The compressed cooled air may be stored during the day time. For example, during the day time when the solar energy units are receiving solar energy and the air in the enclosure of the solar energy units is heated. This air is compressed using the compressor. Thereafter, the heat energy associated with the compressed air is utilized in purification of the one or more fluids. The compressed cooled air thus released is stored during the day time. The stored compressed cooled air may be utilized during the night time.

Additionally, in an embodiment, the purification of the one or more fluids includes desalination of the one or more fluids. For example, a sea water is desalinated in the one or more fluid purification units using the heat energy associated with the compressed hot air. It will be apparent to a person skilled in the art that the purification of the one or more fluids may be performed using any other purification processes known in the art that uses heat energy for purification.

Further, in response to the purification of the one or more fluids, one or more hot purified fluids are obtained. At step 106, the one or more hot purified fluids are stored in one or more fluid storage tanks. Thereafter, the compressed cooled air is heated using a heat energy associated with the one or more hot purified fluids at step 108. The compressed cooled air is heated to obtain a heated compressed air.

In an embodiment, the compressed cooled air is passed through a fluid storage tank of the one or more fluid storage tanks to heat the compressed cooled air. In response to passing the compressed cooled air through the fluid storage tank of the one or more fluid storage tanks, the heat energy associated with the one or more hot purified fluids is transferred to the compressed cooled air. As a result, the heated compressed air is obtained.

For example, a hot distilled water obtained in response to desalination of a sea water in a fluid purification unit is stored in a fluid storage tank. Meanwhile, the fluid purification unit also releases the compressed cooled air in response to utilizing the heat energy associated with the compressed hot air. Thereafter, the compressed cooled air is heated by utilizing the heat energy associated with the hot distilled water. The heat energy associated with the hot distilled water is utilized by passing the compressed cooled air through a heat exchanger tube present within the fluid storage tank. Thus, the heat energy associated with the hot distilled water is transferred to the compressed cooled air passing through the heat exchanger tube. As a result, the heated compressed air is obtained.

Thereafter at step 110, one or more turbines are operated using a heat energy associated with the heated compressed air thereby obtaining an expanded cooled air. For example, in order to operate a turbine of the one or more turbines, the heat energy associated with the heated compressed air is utilized. The turbine expands the compressed hot air by decreasing a pressure and a temperature of the compressed hot air.

Further, the expanded cooled air obtained from the one or more turbines is utilized for cooling. The cooling may include but is not limited to, cooling of one or more liquids, air cooling, cooling of one or more solar energy units, freeze desalination, cooling of server rooms, and cooling of circuit boards. In a scenario, the expanded cooled air is used to cool water. The cooled water thus obtained may be used for air cooling.

Figure 2:
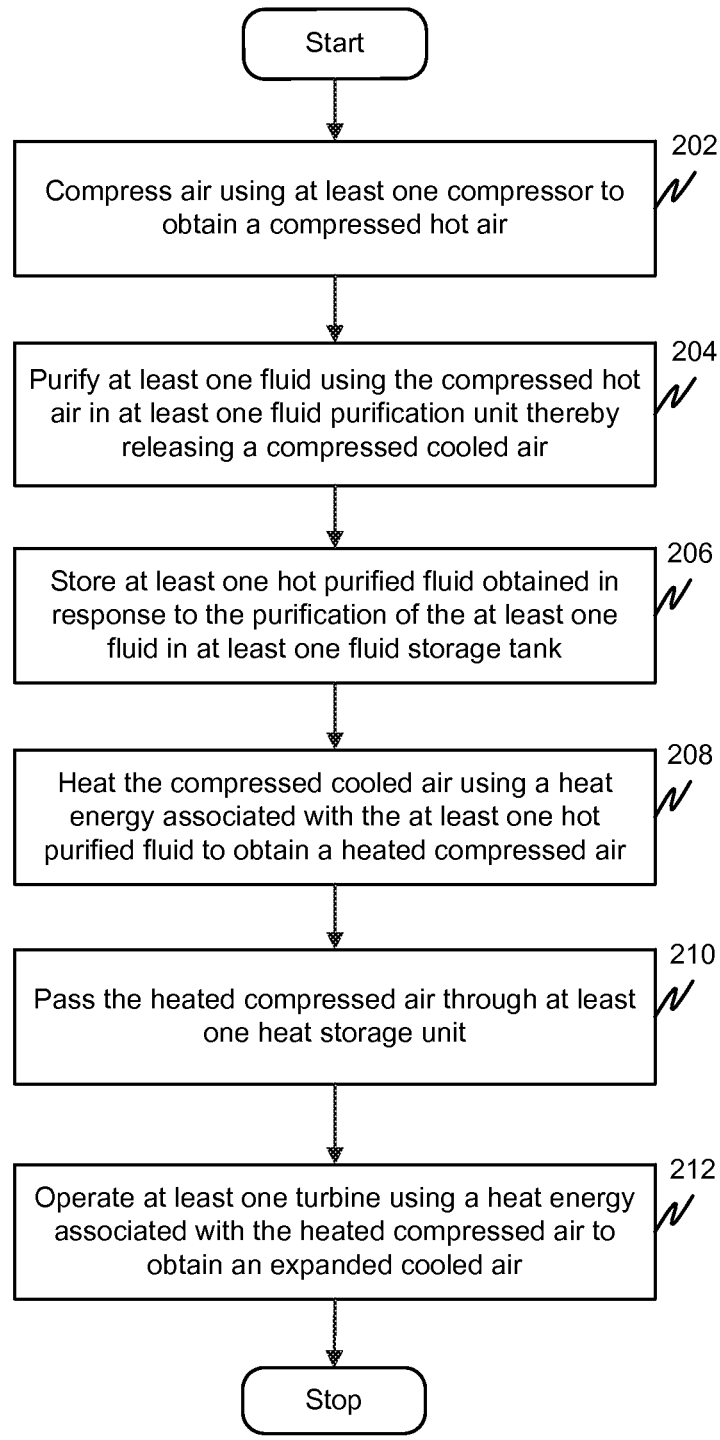
FIG. 2 is a flow chart illustrating a method of managing heat energy in a fluid purification system in accordance with another embodiment of the invention.

FIG. 2 is a flow chart illustrating a method of managing heat energy in a fluid purification system, in accordance with another embodiment of the invention. The fluid purification system purifies one or more fluids. In order to purify the one or more fluids the heat energy associated with air is used. To use the heat energy associated with the air, the air is compressed using one or more compressors at step 202. The one or more compressors compress the air to obtain a compressed hot air. A heat energy associated with the compressed hot air is greater than a heat energy associated with the air. This is explained in detail in conjunction with FIG. 1.

In response to obtaining the compressed hot air, the one or more fluids are purified using the compressed hot air at step 204. The one or more fluids are purified in one or more fluid purification units using the heat energy associated with the compressed hot air. Once the one or more fluids are purified, a compressed cooled air is released. In an embodiment, the purification of the one or more fluids includes desalination of the one or more fluids.

Further, in response to the purification of the one or more fluids, one or more hot purified fluids are obtained. At step 206, the one or more hot purified fluids are stored in one or more fluid storage tanks. Thereafter, the compressed cooled air is heated using a heat energy associated with the one or more hot purified fluids at step 208. The compressed cooled air is heated to obtain a heated compressed air. This is explained in detail in conjunction with FIG. 1.

At step 210, the heated compressed air is passed through one or more heat storage units prior to operating one or more turbines. While passing the heated compressed air through the one or more heat storage units, a portion of heat energy stored in the one or more heat storage units is transferred to the heated compressed air. As a result, the heat energy associated with the heated compressed air is increased prior to operating the one or more turbines.

In an embodiment, the one or more heat storage units store one or more portions of the heat energy received from the one or more fluid storage tanks. The one or more portions of the heat energy are associated with the one or more hot purified fluids. Thereafter, the heat energy stored in the one or more heat storage units is utilized to increase the heat energy associated with the heated compressed air. The one or more heat storage units may include one or more heat storage mediums for storing the heat energy. Examples of the one or more heat storage mediums may include but are not limited to, oil, water, and molten salt. For example, the heat energy associated with a hot purified fluid is transferred to a heat storage unit. Thereafter, the heated compressed air is passed through one or more heat exchanger tubes present in the heat storage unit. While passing the heated compressed air, the heat energy stored in the heat storage unit transfers to the heated compressed air. As a result, the heat energy associated with the heated compressed air is increased prior to operating the one or more turbines.

Thereafter at step 212, the one or more turbines are operated using a heat energy associated with the heated compressed air thereby obtaining an expanded cooled air. The expanded cooled air thus obtained is utilized for cooling. Simultaneously, the one or more turbines generate electricity utilizing the heat energy associated with the heated compressed air. This is explained in detail in conjunction with FIG. 1.

Figure 3:
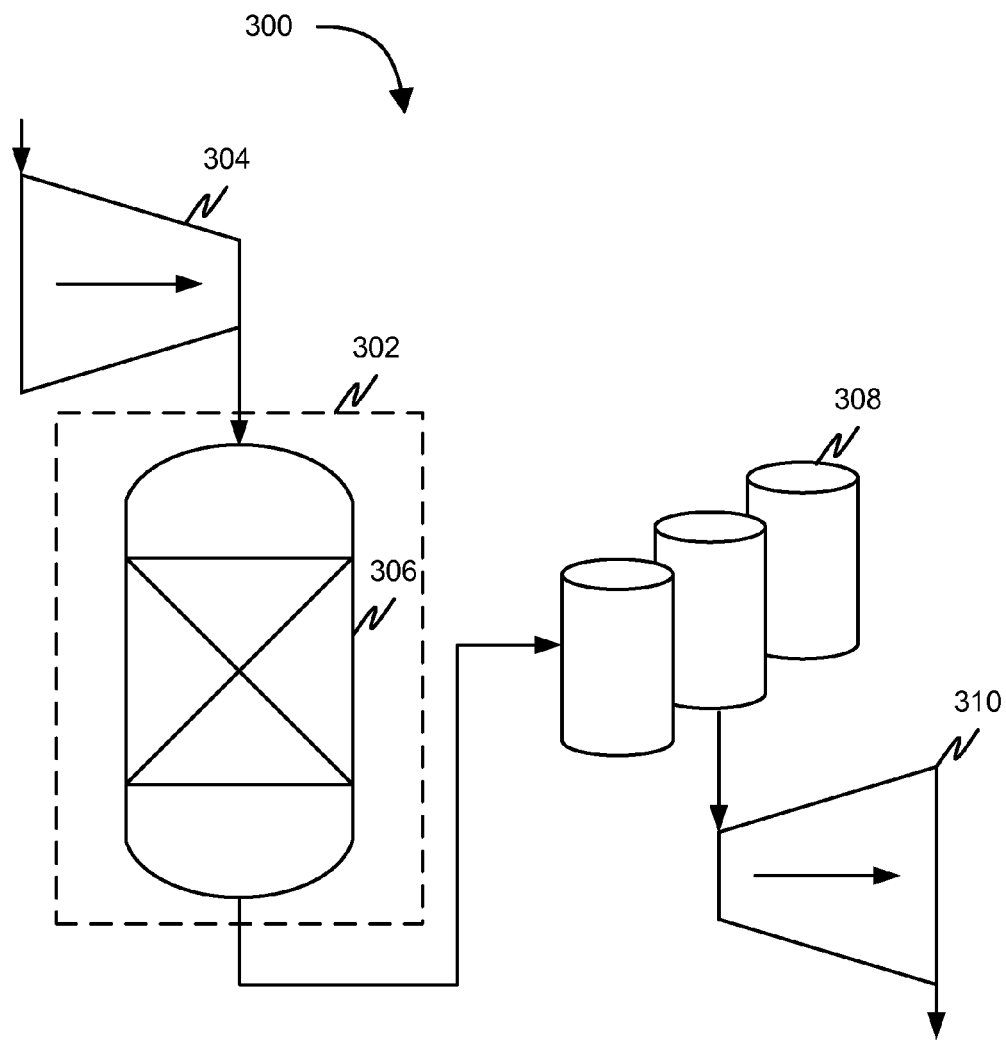
FIG. 3 is a block diagram illustrating a system for managing heat energy in a fluid purification system in accordance with an embodiment of the invention.

Referring now to FIG. 3, a block diagram of a system 300 for managing heat energy in a fluid purification system 302 is illustrated, in accordance with an embodiment of the invention. Fluid purification system 302 purifies one or more fluids. In order to purify the one or more fluids, the heat energy associated with air is used. To use the heat energy associated with the air, system 300 includes one or more compressors 304. One or more compressors 304 compress the air. In an embodiment, the air may be an ambient air.

In another embodiment, one or more compressors 304 may receive the air from one or more solar energy units. In order to receive the air from the one or more solar energy units, one or more suctions tubes that connect the one or more solar energy units and one or more compressors 304 are used. In this scenario, the heat energy associated with the air is obtained from solar energy. This is explained in detail in conjunction with FIG. 1.

One or more compressors 304 then compress the air to obtain a compressed hot air. A heat energy associated with the compressed hot air is greater than a heat energy associated with the air.

The heat energy associated with the compressed hot air is used by fluid purification system 302 for purifying one or more fluids. Fluid purification system 302 includes one or more fluid purification units 306 for purifying the one or more fluids using the compressed hot air. One or more fluid purification units 306 receives the compressed hot air from one or more compressors 304 and purifies the one or more fluids using the heat energy associated with the compressed hot air. In response to purification of the one or more fluids, a compressed cooled air is released. In an embodiment, the purification of the one or more fluids may include desalination of the one or more fluids. For instance, a fluid purification unit of one or more purification units 306 uses the heat energy associated with the compressed hot air to desalinate sea water. In this case, the heat energy obtained from the air in the enclosure of the solar energy unit is utilized for the desalination of the sea water. In response to the desalination of the sea water, one or more hot purified fluids are obtained and the compressed cooled air is released. It will be apparent to a person skilled in the art that the purification of the one or more fluids may include any other purification process known in the art that uses heat energy for purification.

In order to store the one or more hot purified fluids, system 300 includes one or more fluid storage tanks 308. Thereafter, the compressed cooled air is heated using a heat energy associated with the one or more hot purified fluids. The compressed cooled air is heated to obtain a heated compressed air. This is explained in detail in conjunction with FIG. 1.

In an embodiment, the compressed cooled air is passed through one or more fluid storage tanks of one or more fluid storage tanks 308 to heat the compressed cooled air. The compressed cooled air is heated using the heat energy associated with the one or more hot purified fluids. In response to passing the compressed cooled air through the one or more fluid storage tanks 308, the heat energy associated with the one or more hot purified fluids is transferred to the compressed cooled air. As a result, the heated compressed air is obtained. The heated compressed air is obtained by transferring the heat energy to the compressed cooled air.

Additionally, system 300 includes one or more turbines 310. One or more turbines 310 are operated using a heat energy associated with the heated compressed air to obtain an expanded cooled air. For example, in order to operate a turbine of one or more turbines 310, the heat energy associated with the heated compressed air is utilized. Thereafter, the turbine expands the compressed hot air by decreasing a pressure and a temperature of the compressed hot air. Subsequently, the expanded cooled air obtained from the turbine is utilized for cooling. This is explained in detail in conjunction with FIG. 1.

Figure 4:
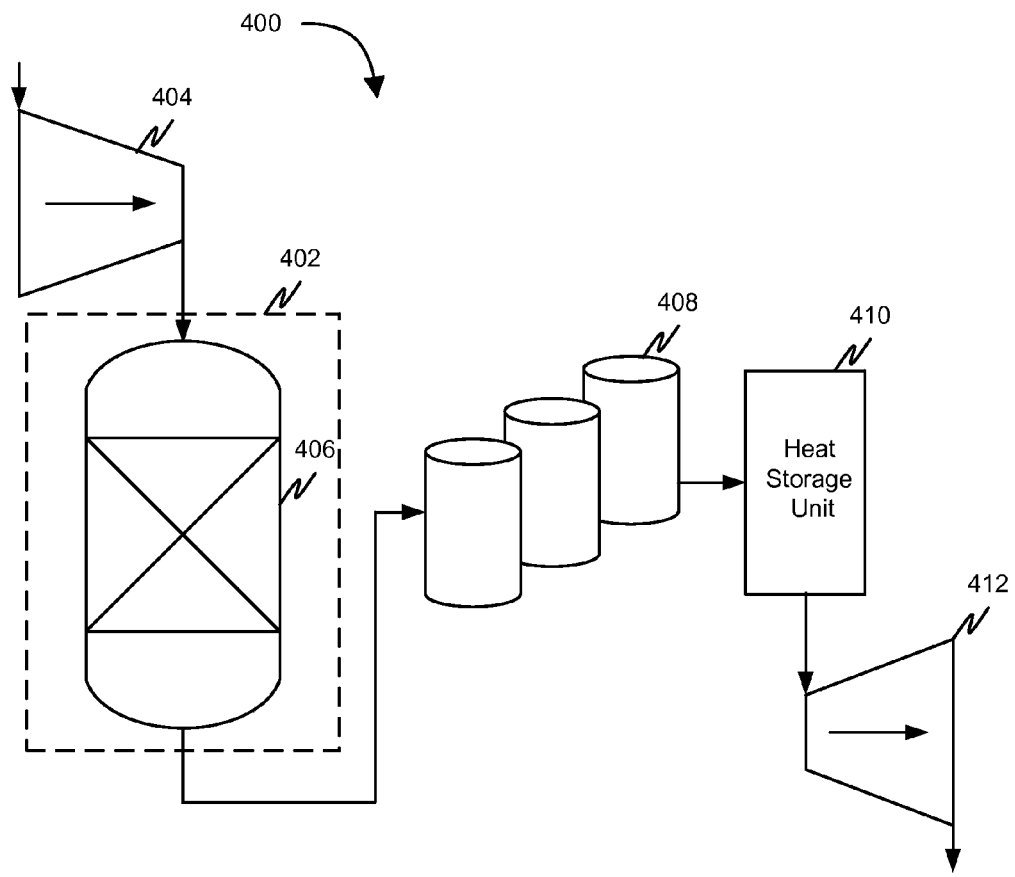
FIG. 4 is a block diagram illustrating a system for managing heat energy in a fluid purification system in accordance with another embodiment of the invention.

Moving to FIG. 4, a block diagram of a system 400 for managing heat energy in a fluid purification system 402 is illustrated, in accordance with another embodiment of the invention. Fluid purification system 402 purifies one or more fluids. In order to purify the one or more fluids the heat energy associated with air is used. To use the heat energy associated with the air, system 400 includes one or more compressors 404. One or more compressors 404 compress air. One or more compressors 404 compress the air to obtain a compressed hot air. As a result, a heat energy associated with the compressed hot air is greater than a heat energy associated with the air.

Additionally, fluid purification system 402 includes one or more fluid purification units 406. One or more fluid purification units 406 purify one or more fluids using the compressed hot air. The one or more fluids are purified in one or more fluid purification units 406 using the heat energy associated with the compressed hot air. In response to purification of the one or more fluids, a compressed cooled air is released. This is explained in detail in conjunction with FIG. 3.

In response to the purification of the one or more fluids, one or more hot purified fluids are obtained. In order to store the one or more hot purified fluids, system 400 includes one or more fluid storage tanks 408. Thereafter, the compressed cooled air is heated using a heat energy associated with the one or more hot purified fluids. The compressed cooled air is heated to obtain a heated compressed air.

Additionally, system 400 includes one or more heat storage units 410. The heated compressed air is passed through one or more heat storage units 410 to increase the heat energy associated with the heated compressed hot air. While passing the heated compressed air through one or more heat storage units 410, a portion of heat energy stored in one or more heat storage units 410 is transferred to the heated compressed air. As a result, the heat energy associated with the heated compressed air is increased.

In an embodiment, one or more heat storage units 410 store one or more portions of the heat energy received from one or more fluid storage tanks 408. The one or more portions of the heat energy are associated with the one or more hot purified fluids. The one or more portions of the heat energy stored in one or more heat storage units 410 is utilized to increase the heat energy associated with the heated compressed air. One or more heat storage units 410 may include one or more heat storage mediums. Examples of the one or more heat storage mediums may include but are not limited to, oil, water, and molten salt. For example, the heat energy associated with the one or more hot purified fluids is transferred to one or more heat storage units 410. One or more heat energy units 410 store the heat energy associated with the one or more hot purified fluids. Thereafter, the heated compressed air is passed through heat exchanger tubes present in one or more heat storage units 410. While passing the heated compressed air through heat exchanger tubes, the heated compressed air receives the heat energy stored in one or more heat energy units 410. As a result, the heat energy associated with the heated compressed air is increased.

The heated compressed air is expanded by system 400 to produce expanded cooled air for cooling. System 400 also includes one or more turbines 412 to produce the expanded cooled air. Thus, one or more turbines 412 receives the heated compressed air from one or more heat energy units 410. One or more turbines 412 are operated using a heat energy associated with the heated compressed air. During operation, the heated compressed air is expanded in one or more turbines 412 to obtain an expanded cooled air. This is explained in detail in conjunction with FIG. 3.

Various embodiments of the invention provide a method and system for managing heat energy in a fluid purification system. The method and system utilizes waste heat energy associated with the air in purifying one or more fluids. Moreover, the one or more turbines generate electricity by reusing the heat energy produced in the fluid purification system. The method and system also efficiently utilizes heat energy associated with air generated within the fluid purification system by using the heat energy in cooling processes.

Those skilled in the art will realize that the above recognized advantages and other advantages described herein are merely exemplary and are not meant to be a complete rendering of all of the advantages of the various embodiments of the invention.

In the foregoing specification, specific embodiments of the invention have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of the invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A method of utilizing waste energy from a fluid purification system, the method comprising:
    compressing air using at least one compressor to obtain a compressed hot air, wherein a heat energy associated with the compressed hot air is greater than a heat energy associated with the air;
    purifying at least one fluid using the compressed hot air in at least one fluid purification unit including:
    placing the at least one fluid in a first thermal communication with the compressed hot air;
    allowing a transfer of heat from the compressed hot air to the at least one fluid to raise a temperature of the at least one fluid to a purification temperature or to a boiling temperature for a distillation;
    releasing a compressed cooled air from the first thermal communication;
    storing at least one hot purified fluid from the fluid purification unit in at least one fluid storage tank;
    placing the compressed cooled air in a second thermal communication with the at least one fluid storage tank to reheat the compressed cooled air to obtain a heated compressed air; and
    operating at least one turbine to generate electricity using the reheated compressed air;
    obtaining an expanded cooled air from the turbine; and
    directing the expanded cooled air to air cool a room.

2. The method of claim 1, wherein the at least one compressor receives the air from at least one solar energy unit using at least one suction tube connected to the at least one solar energy unit and the at least one compressor, the heat energy associated with the air is obtained from solar energy.

3. The method of claim 1, wherein purifying the at least one fluid comprises desalinating the at least one fluid.

4. The method of claim 1, wherein a fluid of the at least one fluid is one of a sea water and a waste water.

5. The method of claim 1, wherein heating the compressed cooled air using the heat energy associated with the at least one hot purified fluid comprises:
    passing the compressed cooled air through at least one of the at least one fluid storage tank; and
    transferring the heat energy associated with the at least one hot purified fluid to the compressed cooled air in response to passing the compressed cooled air to obtain the heated compressed air.

6. The method of claim 1 further comprising passing the heated compressed air through at least one heat storage unit, wherein a portion of heat energy stored in the at least one heat energy unit is transferred to the heated compressed air prior to operating the at least one turbine to obtain the expanded cooled air.

7. The method of claim 6, wherein the at least one heat storage unit stores at least one portion of the heat energy associated with the at least one hot purified fluid received from the at least one fluid storage tank.

8. A system for utilizing waste energy from a fluid purification system, the system comprising:
    at least one compressor for compressing air to obtain a compressed hot air, wherein a heat energy associated with the compressed hot air is more than a heat energy associated with the air;
    a fluid purification system comprising at least one fluid purification unit for purifying at least one fluid by applying the compressed hot air to the at least one fluid in a thermal communication with the fluid to raise a temperature of the at least one fluid to a purification temperature or to a boiling temperature for a distillation;
    a first heat exchanger to obtain a compressed cooled air from the fluid purification unit;
    at least one fluid storage tank for storing at least one hot purified fluid from the fluid purification unit;
    a second heat exchanger associated with the hot purified fluid to reheat the compressed cooled air to obtain a heated compressed air;
    at least one turbine to generate electricity from the reheated compressed air; and
    a room in communication with an output of the turbine to receive
    an expanded cooled air for cooling the room.

9. The system of claim 8, wherein the air is received from at least one solar energy unit by the at least one compressor, the at least one compressor obtains the air from the at least one solar energy unit using at least one suction tube connected to the at least one solar energy unit and the at least one compressor, the heat energy associated with the air is obtained from solar energy.

10. The system of claim 8, wherein purification of the at least one fluid comprises desalination of the at least one fluid.

11. The system of claim 8, wherein a fluid of the at least one fluid is one of a sea water and a waste water.

12. The system of claim 8, wherein the compressed cooled air is heated using the heat energy associated with the at least one hot purified fluid by:

passing the compressed cooled air through the at least one fluid storage tank; and transferring the heat energy associated with the at least one hot purified fluid to the compressed cooled air in response to passing the compressed cooled air through the at least one fluid storage tank thereby obtaining the heated compressed air.

13. The system of claim 8 further comprising at least one heat storage unit for transferring a portion of heat energy stored in the at least one heat energy unit to the heated compressed air prior to operating the at least one turbine to obtain the expanded cooled air.

14. The system of claim 13, wherein the at least one heat storage unit stores at least one portion of the heat energy associated with the at least one hot purified fluid received from the at least one fluid storage tank.

* * * * *